Patented Oct. 17, 1933

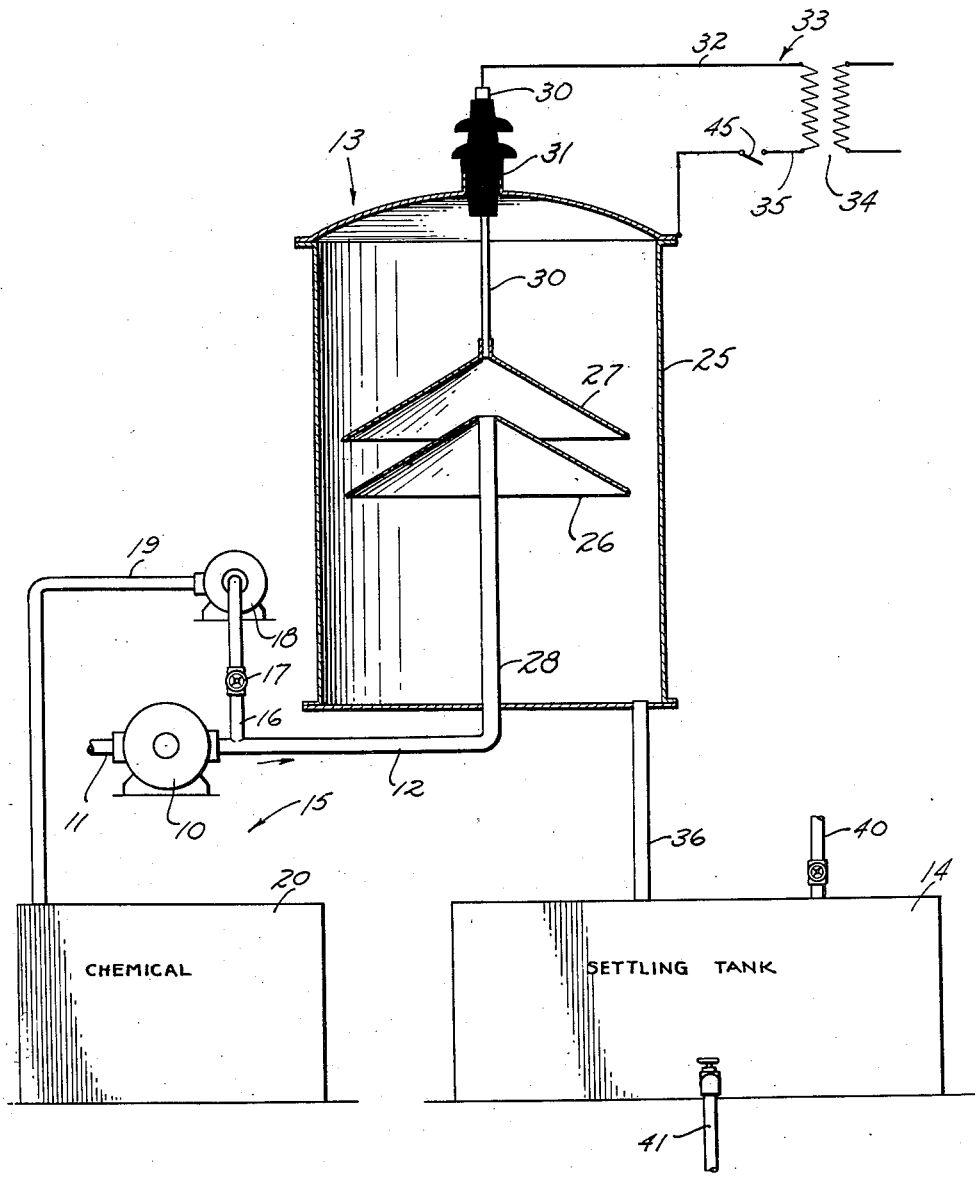

1,931,112

UNITED STATES PATENT OFFICE 1,931,112

METHOD OF TREATING PETROLEUM EMULSIONS

Abraham M. Herbsman, Huntington Park, Calif., assignor to Industrial Patents, Ltd., Los Angeles, Calif., a corporation of California Application May 11, 1931. Serial No. 536,490

1 Claim. (Cl. 196—4)

My invention relates to the treatment of petroleum emulsions and has for its principal object the provision of a novel method of agglomerating the dispersed water phase in these emulsions so that the oil in the emulsion may be separated from the water and become commercially useful.

In the oil industry, petroleum is produced from wells under high pressures, which pressures rapidly decrease as the oil is brought to the surface of the ground. This frequently is accompanied by formation of water and oil emulsions which it is necessary to break down and the oil separated therefrom before it can be refined. The principal methods at present in use for accomplishing the breaking down of these emulsions include so-called electric dehydration, and treatment with chemicals. Sometimes these two methods are combined with a resulting decrease in the length of time required for accomplishing the breaking of the emulsions.

It is an object of my invention to provide a method of inexpensively treating petroleum emulsions prior to their being subjected to an electrical dehydration process which will greatly increase the effectiveness of the electrical dehydration and materially reduce the entire cost of breaking down the emulsion.

The use of electric dehydration, however, is relatively expensive, although it ordinarily consumes considerably less time to dehydrate emulsions than is required in using the chemical method.

It is accordingly another object of my invention to provide a method of treating petroleum emulsions chemically which may be performed in less time than is required by similar processes now in use.

In some of the more commonly used methods for chemically breaking petroleum emulsions a relatively large amount of chemical is required for accomplishing the desired purpose.

It is a further object of my invention to provide a method of breaking petroleum emulsions chemically in which a relatively small amount of chemical is required for the process.

While various theories have been advanced as to the effect of chemicals in the breaking of petroleum emulsions, the theory most generally accepted is that the agglomeration of the dispersed phase in the emulsion results not from any distinctly chemical reaction but from some peculiar physical effect of the chemical added which reduces the surface tension between the globules of a dispersed phase and the continuous phase so as to permit the force of gravity to coalesce the particles in the dispersed phase.

The process of my invention involves the treatment of a body of petroleum emulsion with a solution of a chemical compound having a chlorine radical. Compounds of this nature which have been found most useful are those which have the property of liberating free chlorine. A few examples of such compounds, the use of which in the treatment of petroleum emulsion is contemplated by my invention, are as follows: chlorinated oils, chlorocosane, chloramine toluene, and hydroclorites.

Chlorocosane is a term used to designate chlorinated paraffin and generally contains between 30% and 40% of chlorine. Chlorocosane is formed by passing chlorine through melted paraffin with the latter at a temperature of 125° to 140° C.

The drawing is a diagrammatic figure illustrating a form of apparatus suitable for carrying out the method of my invention and includes an emulsion pump 10 for receiving petroleum emulsion from an emulsion line 11 and propelling this through a line 12 into an electric dehydrator 13 from which the emulsion is conducted to a settling tank 14. Connected to the emulsion line 12 is a chemical injecting apparatus 15 including a small pipe 16 which opens into the oil line 12 and which has a valve 17 and connects to a small chemical pump 18 which is connected up to draw chemical through a pipe 19 leading to a chemical container 20.

The electric dehydrator 13 includes a shell 25 having a pair of electrodes 26 and 27 supported in spaced relation therein. The electrode 26 is mounted on the upper end 28 of the pipe 12, and the electrode 27 is suspended on the lower end of a conductor 30 which leads through an insulator 31 in the shell 25 and connects to a conductor 32 of a circuit 33 of an electric transformer 34, the circuit 33 being completed by a conductor 35 which leads from the transformer 34 to the shell 25. Leading from the lower end of the shell 25 is a pipe 36 which is adapted to conduct treated emulsion from the shell 25 to the settling tank 14.

The tank 14 is provided with an oil line 40 and a water line 41 for drawing off the separated phases of emulsion from the tank 14.

A preferred manner of performing the method of my invention includes the use of the electric dehydrator 13 so that when operations are commenced the transformer 34 is energized so as to set up a relatively high potential, for example a potential of 11,000 volts, between the electrodes 26 and 27. The shell 25 is at this time filled with oil and the tank 20 is filled, for example, with a solution of chlorocosane.

The pumps 10 and 18 are now started so that emulsion flows through the line 12 into the space between the electrodes 26 and 27 and chlorocosane is drawn from the chemical tank 20 and injected into the line 12 so as to be thoroughly mixed with the emulsion at the time it arrives for treatment in the electric dehydrator 13.

Assuming that the emulsion being treated is of the average viscosity, the valve 17 is now adjusted so that chemical is injected into the line 12 to mix with the emulsion therein in the proportion of one gallon of chemical to 700 barrels of emulsion. The amount of chemical injected into the line 12 depends upon the character of the emulsion, as the more viscous and stubborn the emulsion the larger the amount of chemical required to properly treat it. According to the type of emulsion treated, one gallon of chlorocosane will successfully treat anywhere from 300 to 1000 barrels of emulsion.

The method as thus outlined is continuous and the settling tank is so designed that when it is full the pipe 36 may be switched to another settling tank. The accumulated treated emulsion in the settling tank 14 is then permitted to stand for a period of 12 to 36 hours during which time stratification of the water and oil phases of the emulsion takes place. As soon as stratification is complete the lower phase of water and the upper phase of oil are successively drawn off through the pipe 41 and conducted to separate reservoirs.

I have found that the combined electrical and chemical dehydration process of my invention is more economical in the use of current than former similar processes in general use in the treatment of petroleum emulsions. This advantage may appear in the amount of current actually consumed or in the shortening of the length of time required for phases of the emulsion to stratify out after its being run into the settling tank 14.

The method of my invention also includes the treatment of petroleum emulsion substantially as set forth above but with the electrical treatment eliminated. This may be accomplished with the apparatus shown in the drawing merely by opening a switch 45 provided in the circuit 33. When the electrical treatment is included in the process, stratification of the phases of the emulsion generally takes place in the settling tank after ten or twelve hours. When the process without the electric step is used, however, it is generally necessary for the emulsion to stand in the tank 14 from 12 to 36 hours before stratification is completed.

When the process without the electric step is used, a considerably larger quantity of chemical is generally necessary to effectively separate the phases of the emulsion. For example, it is seldom necessary to put in more than one gallon of chemical for three-hundred barrels of oil when the electrical treatment is included in the process. With the electrical step eliminated, however, stratification within a period of thirty-six hours standing in the settling tank requires that in the chemical treatment the chemical mixed with the emulsion should bear the relation of approximately one gallon of chemical to each one hundred barrels of emulsion.

In treating certain forms of petroleum emulsions it has been found advantageous to heat these either before or after they are mixed with a chemical and maintain the heated emulsion at elevated temperature during the stratification. The heating in certain cases accelerates the stratification and greatly increases the capacity of a certain given size of apparatus. In using heat in my process, tight emulsions would be heated to a temperature of about 160° to 180° F., whereas if the emulsions are loose a temperature of 80° to 100° F. is as effective as a higher temperature would be in accelerating the stratification.

While I have described the preferred embodiment of my invention as utilizing only a chlorine radical compound for chemically treating the emulsion, I have found that the advantages of my invention may be obtained in a large measure by mixing the chlorine radical compound with some other emulsion treating chemical, such, for instance, as a solution of ammonium cresylate.

What I claim is:

The method of treating a petroleum emulsion which consists in mixing a quantity of chloramine toluene with said emulsion, and allowing said emulsion to remain at rest for a substantial period of time to permit stratification.

ABRAHAM M. HERBSMAN.